United States Patent
Nakajima et al.

(10) Patent No.: US 9,823,375 B2
(45) Date of Patent: Nov. 21, 2017

(54) APPARATUS FOR LOGGING WHILE DRILLING ACOUSTIC MEASUREMENT

(75) Inventors: Hiroshi Nakajima, Sagamihara (JP); Toshihiro Kinoshita, Sagamihara (JP); Hiroshi Hori, Sagamihara (JP); Alain Dumont, Kawawaki (JP); Hiroshi Nomura, Sagamihara (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 442 days.

(21) Appl. No.: 13/499,909

(22) PCT Filed: Oct. 26, 2010

(86) PCT No.: PCT/IB2010/002716
§ 371 (c)(1),
(2), (4) Date: Apr. 2, 2012

(87) PCT Pub. No.: WO2011/051776
PCT Pub. Date: May 5, 2011

(65) Prior Publication Data
US 2012/0218862 A1    Aug. 30, 2012

Related U.S. Application Data

(60) Provisional application No. 61/255,067, filed on Oct. 26, 2009.

(51) Int. Cl.
*G01V 1/44* (2006.01)
(52) U.S. Cl.
CPC .................................. *G01V 1/44* (2013.01)

(58) Field of Classification Search
CPC ........ E21B 47/18; E21B 47/16; E21B 47/187; E21B 47/182; E21B 47/12; G01V 11/002
USPC ........................................... 367/81–85
See application file for complete search history.

(56) References Cited

U.S. PATENT DOCUMENTS

| | | | |
|---|---|---|---|
| 5,027,331 A | 6/1991 | Winbow et al. | |
| 5,309,404 A | 5/1994 | Kostek et al. | |
| 5,387,767 A | 2/1995 | Aron et al. | |
| 5,678,643 A * | 10/1997 | Robbins | E21B 7/04 166/255.2 |
| 5,753,812 A | 5/1998 | Aron et al. | |
| 5,796,677 A | 8/1998 | Kostek et al. | |

(Continued)

FOREIGN PATENT DOCUMENTS

| | | | | |
|---|---|---|---|---|
| GB | 2381847 | | 5/2003 | |
| GB | 2381847 A | * | 5/2003 | ............. G01V 1/523 |

(Continued)

OTHER PUBLICATIONS

Office action for the equivalent Japanese patent application No. 2012-535947 dated Apr. 2, 2014.

*Primary Examiner* — James Yang (57) ABSTRACT

Apparatus for acoustic measurement in a downhole environment to enable high quality measurements to be obtained in difficult logging conditions are disclosed. An example apparatus includes a downhole tool having a body with a plurality of transmitters located on the body. A receiver is located on the body a distance from the transmitters and an attenuator section is integrally formed on the body between at least one transmitter and the receiver.

20 Claims, 6 Drawing Sheets

(56) References Cited

U.S. PATENT DOCUMENTS

| | | | |
|---|---|---|---|
| 5,852,587 A * | 12/1998 | Kostek | G01V 1/46 |
| | | | 175/50 |
| 6,088,294 A * | 7/2000 | Leggett, III | E21B 44/00 |
| | | | 175/45 |
| 6,308,137 B1 | 10/2001 | Underhill et al. | |
| 6,366,531 B1 | 4/2002 | Varsamis et al. | |
| 6,466,513 B1 | 10/2002 | Pabon et al. | |
| 6,552,962 B1 | 4/2003 | Varsamis et al. | |
| 6,564,883 B2 | 5/2003 | Fredericks et al. | |
| 6,631,327 B2 * | 10/2003 | Hsu | G01V 1/284 |
| | | | 340/854.4 |
| 6,643,221 B1 | 11/2003 | Hsu et al. | |
| 6,850,168 B2 | 2/2005 | Tang et al. | |
| 6,985,086 B2 | 1/2006 | Tang et al. | |
| 7,257,489 B2 | 8/2007 | Hsu et al. | |
| 7,364,007 B2 | 4/2008 | Garcia-Osuna et al. | |
| 7,367,392 B2 | 5/2008 | Duong et al. | |
| 7,460,435 B2 | 12/2008 | Garcia-Osuna et al. | |
| 7,637,161 B2 * | 12/2009 | Vornbrock | G01N 29/24 |
| | | | 181/102 |
| 8,225,868 B2 | 7/2012 | Morley et al. | |
| 8,256,565 B2 | 9/2012 | Pabon et al. | |
| 8,286,475 B2 | 10/2012 | Nakajima et al. | |
| 2003/0002388 A1 | 1/2003 | Mandal | |
| 2006/0062082 A1 | 3/2006 | Mandal | |
| 2006/0198242 A1 | 9/2006 | Geerits et al. | |
| 2007/0156359 A1 | 7/2007 | Varsamis et al. | |
| 2008/0066965 A1 | 3/2008 | Pabon et al. | |
| 2010/0000311 A1 | 1/2010 | Nakajima et al. | |

FOREIGN PATENT DOCUMENTS

| | | |
|---|---|---|
| JP | 03-055392 | 3/1991 |
| JP | 08-254578 | 10/1996 |
| JP | 10-062555 | 3/1998 |
| WO | 2008/150253 | 12/2008 |

* cited by examiner

APPARATUS FOR LOGGING WHILE DRILLING ACOUSTIC MEASUREMENT

RELATED APPLICATION

This patent claims the benefit of provisional U.S. Patent Application No. 61/255,067, filed Oct. 26, 2009, which is hereby incorporated by reference herein in its entirety.

FIELD OF THE DISCLOSURE

The present disclosure relates generally to sonic logging systems and, more specifically, to logging while drilling tools that enable high quality acoustic measurements to be obtained in difficult logging conditions.

BACKGROUND

Formation properties can be measured during the excavation of a wellbore, or shortly thereafter, through the use of tools integrated into the bottomhole assembly in a process known as logging while drilling (LWD). The LWD process allows the properties of a formation to be measured before drilling fluids invade deeply. Further, many wellbores prove to be difficult to measure with conventional wireline tools, especially highly deviated wells. In these situations, the use of LWD measurements ensures that at least some measurement of the subsurface is captured in the event that wireline operations are not possible. Timely LWD data can also be used to guide well placement so that the wellbore remains within the zone of interest or in the most productive portion of a reservoir, such as in highly variable shale reservoirs. Currently, LWD tools are capable of producing the energy necessary to measure properties of fast formations and small boreholes. However, increased energy is required to collect quality measurements in difficult logging conditions such as in slow formations and large boreholes.

BRIEF DESCRIPTION OF THE DRAWINGS

FIG. 5b depicts a cross-sectional view of the example acoustic measurement tool of FIG. 5a.

FIG. 6b depicts a cross-sectional view of the example acoustic measurement tool of FIG. 6a.

DETAILED DESCRIPTION

Certain examples are shown in the above-identified figures and described in detail below. In describing these examples, like or identical reference numbers may be used to identify common or similar elements. The figures are not necessarily to scale and certain features and certain views of the figures may be shown exaggerated in scale or in schematic for clarity and/or conciseness. Moreover, while certain preferred embodiments are disclosed herein, other embodiments may be utilized and structural changes may be made without departing from the scope of the invention.

The example acoustic measurement tools described herein may be used with sonic logging systems, such as logging while drilling systems, to enable high quality measurements to be obtained in difficult logging conditions, such as, for example, slow formations and large boreholes. To collect various measurements, such as quadrupole and Stoneley measurements, in slow formations and large boreholes, a logging tool generally needs to emit more energy into the formation than that required for fast formations and small boreholes. Additionally, the quadrupole Airy phase occurs at much lower frequencies in slow formations and/or large boreholes than in fast formations or small boreholes. The example acoustic measurement tools described herein produce acoustic signals having the frequencies and energy required to perform quality sonic measurements, such as, for example, monopole, Stoneley, and quadrupole modes, in fast formations as well as slow formations.

The example acoustic measurement tools described herein may employ one or more transmitter/receiver configurations or arrangements to produce acoustic signals having the characteristics needed to perform quality sonic measurements in difficult logging conditions, such as those noted above. For example, some of these acoustic measurement tools may include a plurality of transmitters located on the tool body or collar. A tool body functions as a drill collar in a bottom hole assembly and, thus, the terms may be used interchangeably. However, in the following description the term "tool body" will be used.

The plurality of transmitters located on the tool body may be individually optimized for a particular firing mode. Generally, each transmitter firing mode requires the transmitter to be a certain shape and/or made of a certain type of piezoelectric material, such as, for example, lead titanate or lead zirconate titanate, to realize excitation of the transmitter in high mode purity. Thus, configurations utilizing a plurality of transmitters enable the design of each transmitter to be individually optimized for a specific firing mode. For example, the tool can be configured such that the first transmitter is optimized for a monopole firing mode operation, while the second transmitter is optimized for a multipole firing mode operation.

The example acoustic measurement tools described herein may include a receiver located on the tool body such that each transmitter described above is spaced at a different axial distance from the receiver. More specifically, configuring the tool with a plurality of transmitters enables the transmitter-to-receiver spacings to be optimized for specific firing modes. For example, the optimal transmitter-to-receiver spacing to attenuate propagation along the tool body for a monopole firing mode is longer than the optimal spacing for a quadrupole firing mode. In this example, the outer diameter of the receiver can be the same or different than the outer diameter of the tool body without affecting the propagation of the transmitted acoustic waves.

Additional components can be added to the example tools described herein. For example, an attenuator section may be integrally formed on the tool body between at least one of the transmitters and the receiver described above. This attenuator may be formed by a plurality of grooves on the tool housing to attenuate propagation of a collar extensional mode with acoustic contrast. Such grooves can be formed either inside or outside of the tool body and may be filled with an acoustic damping material. This damping material can be loose granular materials, such as tungsten particles, to enable more effective damping of unwanted structure-borne acoustic signals, such as collar arrivals. More detailed dampening techniques are described in U.S. Pat. No. 6,643,221 and U.S. Patent Publication No. 2008/0066965, both of which are incorporated herein by reference in their entireties. Alternatively, the attenuator section may be formed without grooves on the tool body for a quadrupole mode measurement.

The example tools can also be equipped with stabilizers located on the tool body such that the transmitters, receiver and attenuator are located between the stabilizers. These stabilizers are adjustable for borehole diameter and can vary based on drill bit size and drilling conditions. The placement of the stabilizers allows the centralization of the transmitter and receiver section to be maximized. This results in greater accuracy and quality of waveform measurements because the effects of the tool on measured data are predictable and can be accounted for in processing.

Additionally, grooves can be placed on the tool housing to contain the transmitter wires and consolidate electrical connections between the outside and inside of the tool body. This permits the holes for the electrical connections to be located outside of the transmitter and receiver section, thereby minimizing the impact of the holes on the measured data.

In one example, the acoustic measurement tool can be configured to have a plurality of transmitters located to one side of a receiver along the tool body. This configuration ensures that reflected waves from the attenuator section do not reach the receiver section. Additionally, this configuration allows the electrical connections needed to drive the plurality of transmitters to be located near to each other. This arrangement reduces the likelihood of crosstalk between transmitter circuits and receiver circuits. Also, this transmitter configuration enables the length of the tool to be less than that of a tool equipped with transmitters on both sides of the receiver.

In another example, the acoustic measurement tool can be configured to have at least two transmitters located on both sides of the receiver on the tool body, and an attenuator located between the two transmitters. This configuration enables the tool body design between the transmitter and receiver to be optimized independently on each side. Furthermore, the outer diameter of the second transmitter can be larger than the overall tool body diameter without affecting the propagation of borehole modes. Additionally, the tool body can be equipped with a plurality of extended blocks. In this example, at least one of the transmitters, formed using a plurality of azimuthally spaced acoustic driver elements or transmitter elements, can have each driver element coupled to a respective one of the plurality of extended blocks. These extended blocks allow the transmitter driver elements to excite the borehole at positions close to the borehole wall.

In another example, the acoustic measurement tool can be configured to have a transmitter located on the attenuator section of the tool body. In this example configuration, the outer diameter of the transmitter located on the attenuator section has an outer diameter approximately equal to the outer diameter of attenuator section. This configuration ensures that the transmitter located on the attenuator section does not affect the propagation of borehole modes excited with the first transmitter. This configuration also prevents acoustic contrast at the transmitter located on the attenuator section that would reflect some of the propagation in front of the transmitter. More detailed information regarding the formation of transmitters on a tool body is described in U.S. Pat. No. 7,460,435 which is incorporated herein by reference in its entirety.

Example acoustic measurement tools described herein may employ one or more transmitter and receiver configurations in addition to the features described above to produce the energy required to perform quality sonic measurements in difficult logging conditions. For example, the tools can be equipped with four azimuthal receivers to acquire quadrupole waves. In that case, the recorded signals can be decomposed into monopole, dipole, and quadrupole modes using a spatial Fourier transform. Alternatively, the example tools can be configured with at least eight receiver arrays. This configuration enables cross-line quadrupole measurements to be acquired and enables detecting quadrupole splitting in anisotropic media. Additionally, this configuration increases the likelihood of undesired higher-order modes being rejected, such as, for example, octupole mode during monopole mode operation. Furthermore, this configuration ensures higher quality azimuthal discrimination for imaging applications. In this configuration, a source can be monopole, dipole, quadrupole, or any other multipole source. Additional information regarding integrated acoustic transmitter and receiver assemblies is contained in U.S. Pat. No. 7,364,007 and U.S. Patent Publication No. 2010/0000311, both of which are incorporated herein by reference in their entireties.

Any of the transmitters described above can be formed using a plurality of acoustic driver elements or transmitter elements. As described herein, the terms "acoustic driver element" and "transmitter element" refer to an element of the transmitter, such as a transducer, that transforms electrical energy into acoustic waves. The term "acoustic driver element" will be used accordingly in the description below.

Each acoustic driver element is distinct or separate and forms a portion of a cylinder. For example, a transmitter can be formed using two cylindrically-shaped acoustic driver elements, each having a semi-circular profile, to be mounted on the tool body. In an alternative example, a transmitter may be formed using two cylindrically-shaped acoustic driver elements, each having a semi-circular profile, while a second transmitter on the same tool body may be physically or electrically formed using four cylindrically-shaped driver elements, each having a quarter circle profile. These four driver elements may be used to emit pressure waves with, for example, the same polarities to excite monopole mode or alternating polarities to excite quadrupole mode. Thus, one transmitter can be configured to operate as a monopole source and the other transmitter can be configured to operate as a multipole source. In this example configuration, the four cylindrically-shaped elements of the second transmitter, each having a quarter circle profile, are aligned with the four receiver arrays. Thus, the transmitter is oriented on the tool body to be aligned azimuthally with the respective receiver array. This configuration allows the in-line quadrupole signals to be recorded. Additionally, in this example configuration, the first transmitter formed using two cylindrically-shaped elements, each having a semi-circular profile, is aligned on the tool body to have a forty-five degree azimuthal or radial offset relative to the receiver. While this first transmitter is dedicated to monopole firing, it can excite some quadrupole mode. The first transmitter is oriented on the tool body relative to the receiver array to reduce reception by the receiver array of a higher-order mode than provided by the first transmitter. This example alignment minimizes any quadrupole contamination onto monopole signals at the receiver because the azimuthal offset causes the quadrupole signal to be minimized at the receiver.

In an alternative example, both transmitters are formed using four cylindrically-shaped acoustic driver elements, each having a quarter circle profile, mounted on the example tool body. In this example, one of the two transmitters is aligned on the tool body to have a forty-five degree azimuthal offset relative to the receiver. This example configuration allows both transmitters to excite monopole, dipole, or quadrupole modes. Furthermore, this configuration allows two signals of the quadrupole mode (which are orthogonal to each other) to be recorded with the receiver.

Figure 1:
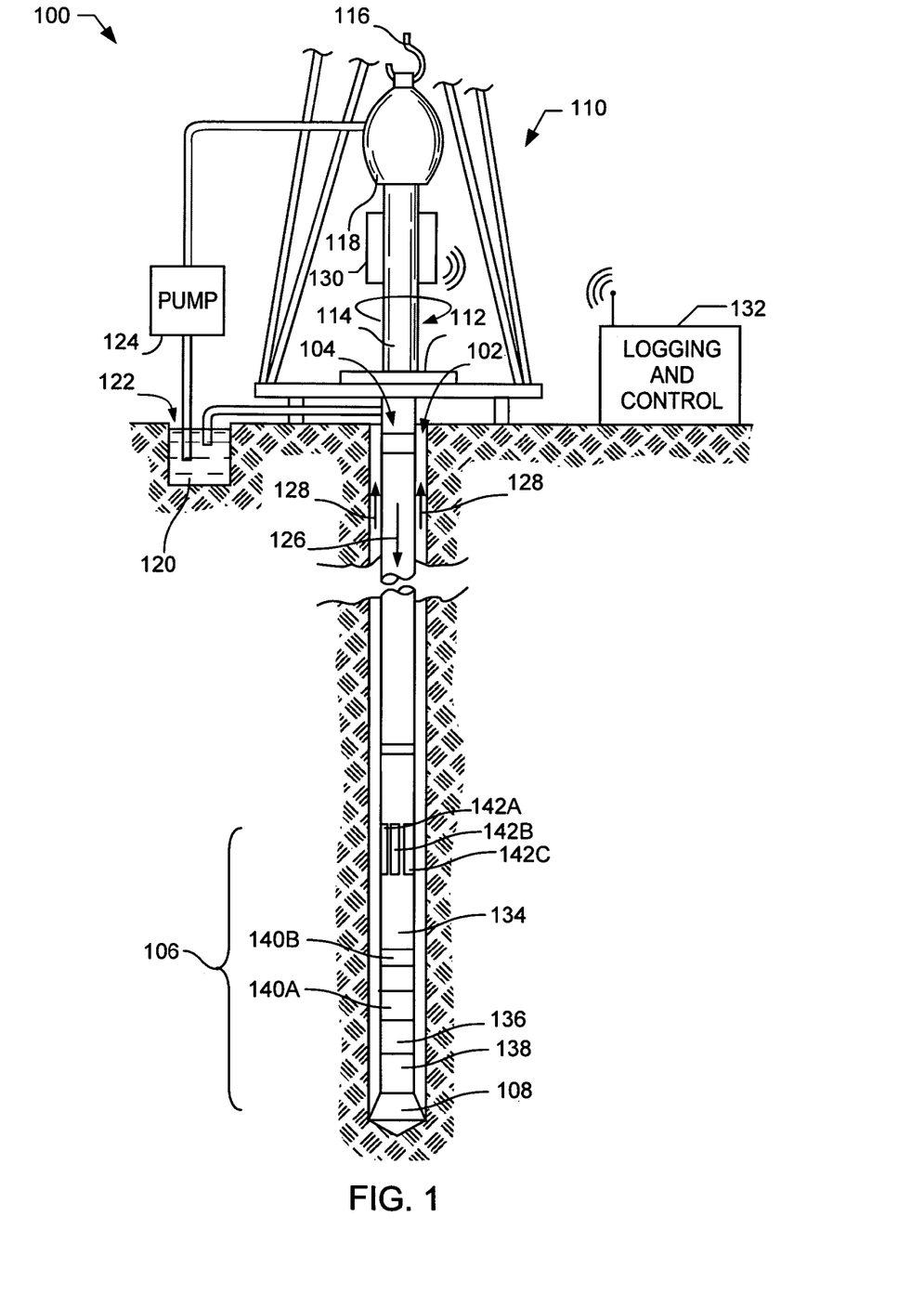
FIG. 1 shows an example wellsite system including a transmitter and receivers to implement the example methods and apparatus described herein.

FIG. 1 shows a wellsite system 100 in which the example methods and apparatus may be implemented. The wellsite system 100 may be onshore or offshore. In the example wellsite system of FIG. 1, a borehole 102 is formed in one or more subsurface formations by rotary and/or directional drilling. A drillstring 104 is suspended within the borehole 102 and has a bottomhole assembly 106 that includes a drill bit 108 at its lower end. The wellsite system 100 includes a platform and derrick assembly 110 positioned over the borehole 102 at the surface. The derrick assembly 110 includes a rotary table 112, which may engage a kelly 114 at an upper end of the drillstring 104 to impart rotation to the drillstring 104. The rotary table 112 may be energized by a device or system not shown. The example drillstring 104 is suspended from a hook 116 that is attached to a traveling block (not shown). Additionally, the drillstring 104 is positioned through the kelly 114 and the rotary swivel 118, which permits rotation of the drillstring 104 relative to the hook 116. Additionally or alternatively, a top drive system (not shown) could be used to impart rotation to the drillstring 104.

In the example depicted in FIG. 1, the wellsite system 100 further includes drilling fluid 120. For example, the drilling fluid 120 may comprise a water-based mud, an oil-based mud, a gaseous drilling fluid, water, gas or other fluid for maintaining bore pressure and/or removing cuttings from the area surrounding the drill bit 108. The drilling fluid 120 may be stored in a pit 122 formed at the wellsite. A pump 124 delivers the drilling fluid 120 to the interior of the drillstring 104 via a port in the rotary swivel 118, causing the drilling fluid 120 to flow downwardly through the drillstring 104 as indicated by directional arrow 126. The drilling fluid 120 exits the drillstring 104 via ports in the drill bit 108 and then circulates upwardly through the annulus region between the outside of the drillstring 104 and the wall of the borehole 102 as indicated by directional arrows 128. The drilling fluid 120 lubricates the drill bit 108, carries cuttings from the formation up to the surface as it is returned to the pit 122 for recirculation, and creates a mudcake layer (not shown) (e.g., filter cake) on the walls of the borehole 102.

Additionally, the wellsite system includes a communications relay 130 and a logging and control processor 132. The example communications relay 130 may receive information and/or data from sensors, transmitters, and/or receivers located within the bottomhole assembly 106. The information may be received by the communications relay 130 via a wired communication path through the drillstring 104 and/or via a wireless communication path. The communications relay 130 transmits the received information and/or data to the logging and control processor 132. Additionally, the communications relay 130 may receive data and/or information from the logging and control processor 132. Upon receiving the data and/or information, the communications relay 130 may forward the data and/or information to the appropriate sensor(s), transmitter(s), and/or receiver(s) within the bottomhole assembly 106.

The example logging and control processor 132 may include a user interface that enables parameters to be input and/or outputs to be displayed. Additionally, the logging and control processor 132 may control imaging of a boundary of a rock layer. For example, the logging and control processor 132 may position the bottomhole assembly 106 and/or a sonic and/or seismic imaging tool within the borehole 102, instruct transmitters to transmit a signal for receivers and/or sensors to receive.

Additionally, the logging and control processor 132 may calculate a distance from the borehole 102 to a portion of a rock boundary based on the transmitted and received signal. Furthermore, the logging and control processor 132 may compensate for anisotropy within the rock layer while calculating the distance from the borehole 102 to a boundary of the rock layer. While the logging and control processor 132 is depicted uphole at the surface and within the wellsite system 100, a portion or the entire logging and control processor 132 may be positioned in the bottomhole assembly 106 and/or in a remote location.

In some examples, the tools of the bottomhole assembly 106 of FIG. 1 may include any number and/or type(s) of logging-while-drilling modules or tools (one of which is designated by reference numeral 134) that may be housed on respective tool bodies. The LWD module 134 shown in FIG. 1 is an example apparatus described in further detail below. The bottomhole assembly 106 may also include measuring-while-drilling (MWD) modules (one of which is designated by reference numeral 136), and a rotary-steerable system or mud motor 138. The MWD module 136 may measure the azimuth and inclination of the drill bit 108 to, for example, monitor the borehole trajectory.

The bottomhole assembly 106 includes capabilities for measuring, processing and/or storing information, as well as for communicating information via, for example, transmitters 140A and 140B and/or receivers 142A-C. The transmitters 140A-B are shown within the LWD module 134. However, the transmitter 140 may be included within the MWD module 136 and/or within a separate sonic and/or seismic imaging tool. Additionally, the receivers 142A-C are shown within the LWD module 134. However, the receivers 142A-C may be included within the MWD module 136 and/or within a separate sonic and/or seismic imaging tool. The transmitters 140A-B and/or the receivers 142A-C may be communicatively coupled to the communications relay 130 and/or the logging and control processor 132. Furthermore, although the two transmitters 140A-B are shown, other examples may include one or more transmitters. Additionally, although only the three receivers 142A-C are shown, other examples may include more or fewer receivers.

The transmitters 140A-B may be capable of transmitting any signal including, but not limited to, acoustic signals, seismic signals, sonic signals, ultrasonic signals, and/or any other compression and/or shear signals. The receivers 142A-C may include sensors that are capable of receiving the signal type generated by the transmitter. For example, if the transmitters 140A-B generate seismic or acoustic signals with a center frequency of 8 kHz, sensors within the receivers 142A-C may be configured to detect the seismic signal with a 8 kHz center frequency while filtering other signals types. The transmitters 140A-B may include any type of device capable of generating a signal, while the receivers 142A-C include sensors that are configured to detect and transduce a signal into electrical data for processing by the logging and control processor 132.

Figure 2:
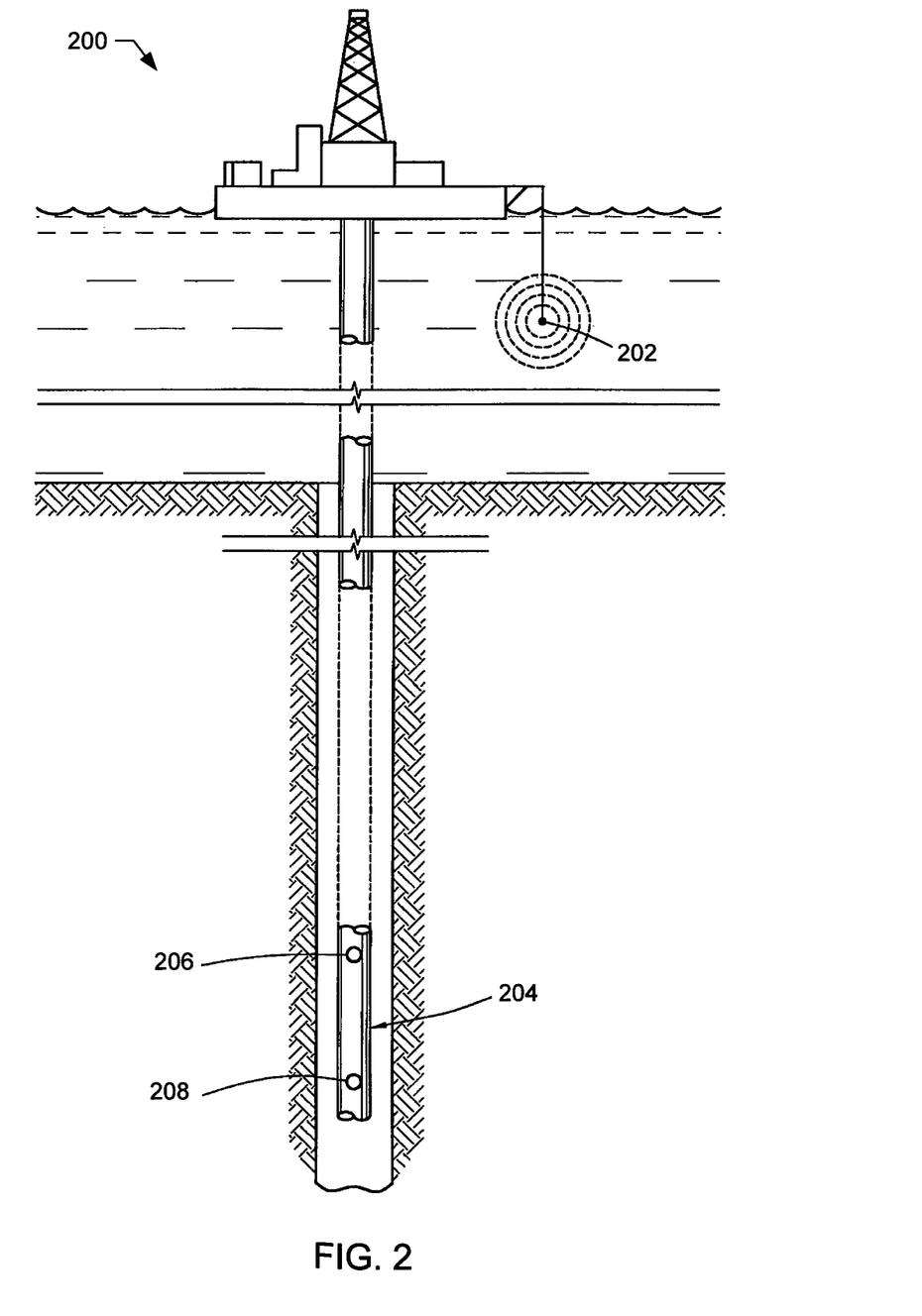
FIG. 2 shows an example sonic logging-while-drilling tool.

Although the components of FIG. 1 are shown and described as being implemented in a particular conveyance type, the example methods and apparatus described herein are not limited to a particular conveyance type but, instead, may be implemented in connection with different conveyance types including, for example, coiled tubing, wireline, wired drill pipe, and/or any other conveyance types known in the industry. Additionally or alternatively, the examples described herein may be implemented with smart wells and/or intelligent completions:

FIG. 2 illustrates a sonic logging-while-drilling tool which can be the LWD tool 134, or can be a part of an LWD tool suite 134A of the type described in U.S. Pat. No. 6,308,137, incorporated herein by reference. In a disclosed embodiment, as shown in FIG. 2, an offshore rig 200 is employed, and a sonic transmitting source or array 202 is deployed near the surface of the water. Alternatively, any other suitable type of uphole or downhole source or transmitter can be provided. An uphole processor controls the firing of the transmitter 202. The uphole equipment can also include acoustic receivers and a recorder for capturing reference signals near the source. The uphole equipment further includes telemetry equipment for receiving MWD signals from the downhole equipment. The telemetry equipment and the recorder are typically coupled to a processor so that recordings may be synchronized using uphole and downhole clocks. The downhole LWD module 204 includes at least acoustic receivers 206 and 208, which are coupled to a signal processor so that recordings may be made of signals detected by the receivers in synchronization with the firing of the signal source.

Figure 3:
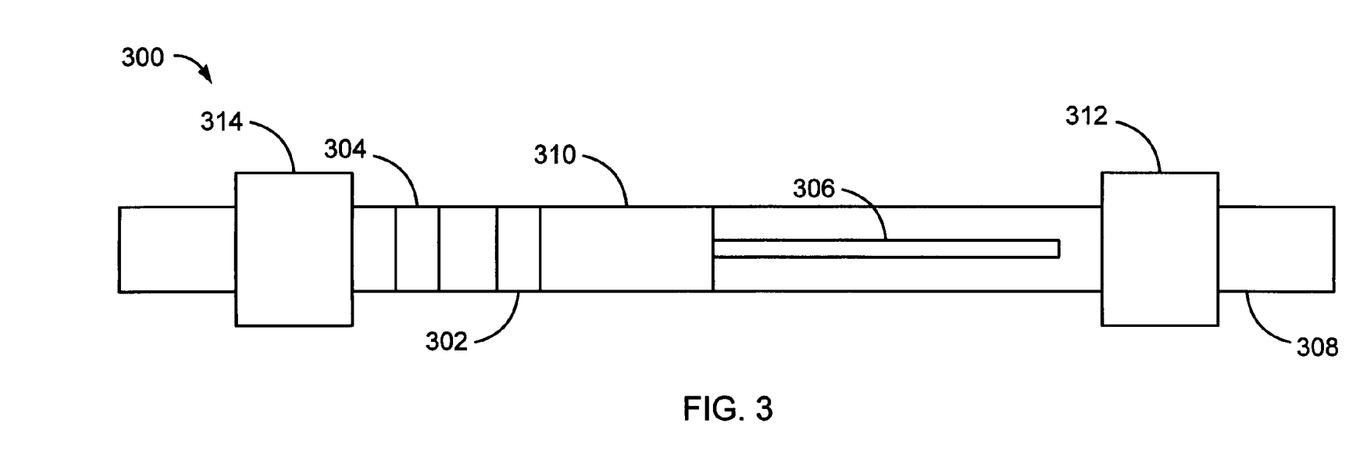
FIG. 3 depicts an example acoustic measurement tool having a plurality of transmitters located to one side of a receiver along a tool body.

FIG. 3 illustrates an example acoustic measurement tool 300 having a plurality of transmitters 302 and 304 located to one side of a receiver 306 along a tool body 308. The example acoustic measurement tool 300 also includes an attenuator 310 integrally formed on the tool body 308 between the transmitters 302 and 304 and the receiver 306, and stabilizers 312 and 314. The stabilizers 312 and 314 are located on the tool body 308 such that the transmitters 302 and 304, the receiver 306, and the attenuator 310 are located between the stabilizers 312 and 314.

In this example, the receiver 306 is located on the tool body 308 such that each of the transmitters 302 and 304 is spaced at a different axial distance from the receiver 306. The example acoustic measurement tool 300 employs this transmitter/receiver configuration to produce acoustic signals having the characteristics needed to perform quality sonic measurements in difficult logging conditions, such as those noted above. In particular, placing the plurality of transmitters 302 and 304 at different axial distances from the receiver 306 enables each of the transmitter-to-receiver spacings to be optimized for a specific firing mode. For example, the optimal transmitter-to-receiver spacing to attenuate propagation along a tool body 308 for a monopole firing mode is longer than the optimal spacing for a quadrupole firing mode. Thus, in this example, the transmitter 304 may be configured to fire in a monopole mode and the transmitter 302 may be configured to fire in a quadrupole mode or other multipole mode. However, in general, the transmitters 302 and 304 can be configured to operate as monopole sources, multipole sources, or any combination thereof. More detailed information on configuring the transmitters 302 and 304 to operate in a monopole or multipole firing mode can be found below in connection with FIGS. 7b-7c.

The stabilizers 312 and 314 are adjustable for borehole diameter and can vary based on drill bit size and drilling conditions. The placement of the stabilizers 312 and 314 on the acoustic measurement tool 300 allows the centralization of the transmitters 302 and 304 and the receiver 306 to be maximized. This enables the acoustic measurement tool 300 to collect measurements with greater accuracy and higher quality because the effects of the tool 300 on measured data are predictable and can be accounted for in processing.

Placing the transmitters 302 and 304 to one side of the receiver 306 along the tool body 308 as shown in FIG. 3 prevents acoustic waves reflected by the attenuator 310 from reaching the receiver 306. More specifically, when acoustic waves are transmitted from the transmitters 302 and 304, the waves reflected by the attenuator 310 are directed back towards the transmitters 302 and 304. Additionally, placing the transmitters 302 and 304 to one side of the receiver 306 allows the electrical connections needed to drive the transmitters 302 and 304 to be located near each other. As a result, the electrical connections for the transmitters 302 and 304 are also separated from the electrical connections for the receiver 306, thereby reducing the likelihood of crosstalk between transmitter circuits and receiver circuits. Also, placing the transmitters 302 and 304 to one side of the receiver 306 allows the length of the acoustic measurement tool 300 to be smaller than the length of other example acoustic measurement tools.

Figure 4:
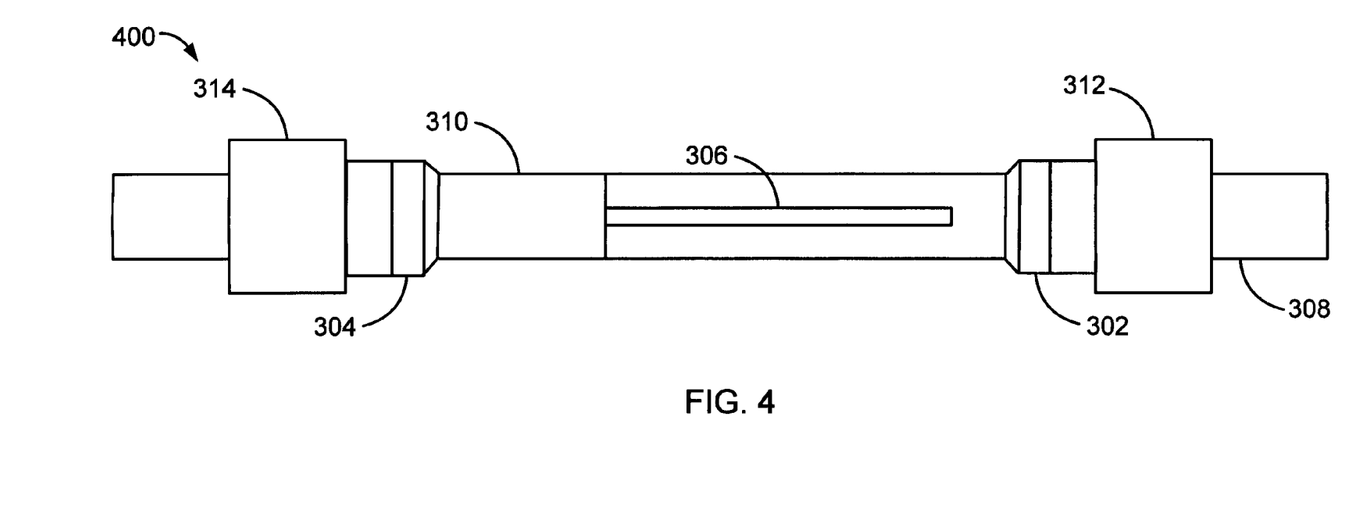
FIG. 4 depicts an example acoustic measurement tool that positions transmitters on both sides of a receiver on a tool body so that an attenuator is located between the transmitters.

FIG. 4 illustrates an example acoustic measurement tool 400 that positions the transmitters 302 and 304 on both sides of the receiver 306 of the tool body 308 so that the attenuator 310 is located between the transmitters 302 and 304. The positioning of the stabilizers 312 and 314 is similar to the positioning shown in FIG. 3. The plurality of transmitters 302 and 304 used in this example provides benefits to the acoustic measurement tool 400 similar to those benefits described above in connection with FIG. 3.

However, placing the transmitters 302 and 304 on both sides of the receiver 306 on the tool body 308 and the attenuator 310 between the two transmitters 302 and 304 enables the design of the tool body 308 between the transmitters 302 and 304 and the receiver 306 to be optimized independently on each side. For example, the outer diameter of the transmitters 302 and 304 can be larger than the overall diameter of the tool body 308 without affecting the propagation of borehole modes. More specifically, because the transmitters 302 and 304 are placed on both sides of the receiver 306, the size of the transmitter 302 does not affect the acoustic waves transmitted by the transmitter 304 and detected by the receiver 306. Additionally, the transmitters 302 and 304 can be closer to a borehole formation, and thus, emit more energy into the formation. This example also allows the strength of the tool body 308 to be increased.

Figure 5A:
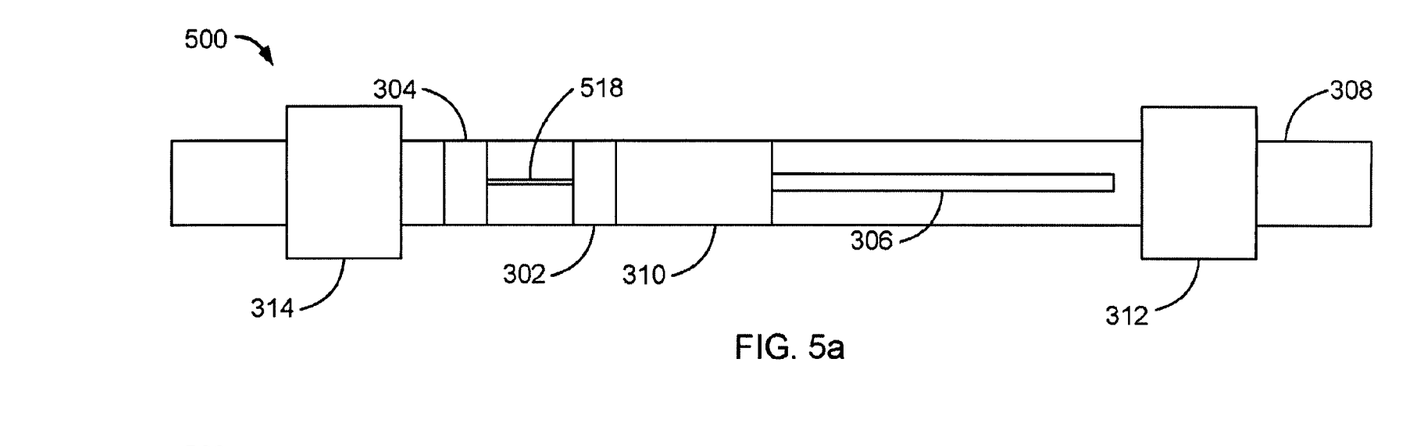
FIG. 5a depicts an example acoustic measurement tool that positions a transmitter on an attenuator of a tool body.

FIG. 5a illustrates an example acoustic measurement tool 500 that positions the transmitter 302 on the attenuator 310 of the tool body 308. In this example, the outer diameter of the transmitter 302 is approximately equal to the outer diameter of the attenuator 310. The positioning of the transmitter 304 and the stabilizers 312 and 314 is similar to the positioning shown in FIG. 3. Also, the plurality of transmitters 302 and 304 used in this example provides benefits to the acoustic measurement tool 300 similar to those benefits described above in connection with FIG. 3.

However, placing the transmitter 302 on the attenuator 310 of the tool body 308 as shown in FIG. 5a ensures that the transmitter 302 does not affect the propagation of borehole modes excited by the transmitter 304. For example, the transmitter 302 will not prevent acoustic waves generated by the transmitter 304 from reaching the receiver 306. Placing the transmitter 302 on the attenuator 310 also prevents acoustic contrast at the transmitter 302 that would otherwise reflect some of the waves transmitted by the transmitter 304 back towards the transmitter 304. While this example shows one transmitter 302 located on the attenuator 310, additional transmitters can be placed on the attenuator 310 to optimize the tool configuration for specific applications.

The acoustic measurement tool 500 also includes a groove 518 on the tool body 308 to contain the electrical wires for the transmitters 302 and 304. While the acoustic measurement tool 500 shows one groove 518, one or more grooves 518 may be formed on the tool body 308. The groove 518 consolidates the electrical connections between the outside and inside of the tool body 308 and permits the holes for the electrical connections to be located away from the transmitters 302 and 304 and the receiver 306, thereby minimizing the impact of these holes on measured data. More detailed information regarding grooves to contain electrical wires and additional components is contained in U.S. Pat. No. 7,367,392 which is incorporated herein by reference in its entirety.

Figure 5B:
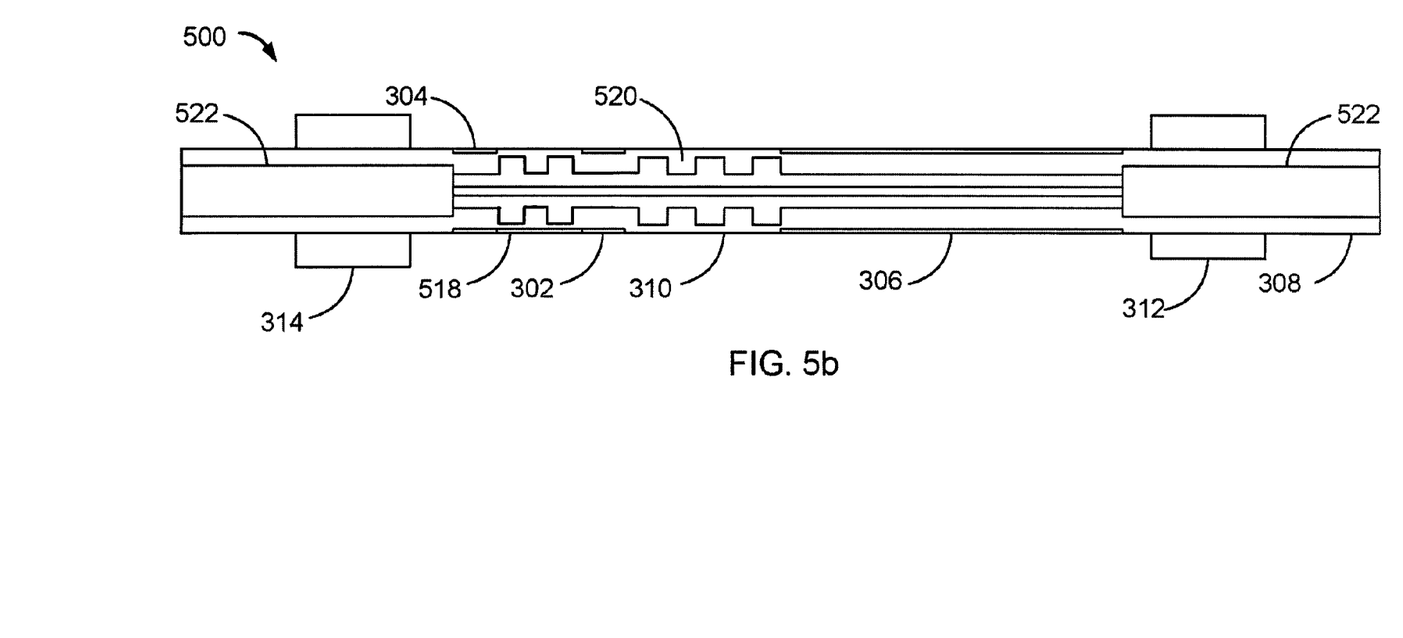

FIG. 5b illustrates a cross-sectional view of the example acoustic measurement tool 500 of FIG. 5a. This view shows the manner in which the attenuator 310 is integrally formed on the tool body 308 between the transmitters 304 and the receiver 306 to attenuate the propagation of unwanted wave modes. While the attenuator 310 is shown here in connection with the example acoustic measurement tool 500 of FIG. 5a, it may be formed on the other example acoustic measurement tools described herein in the same manner. In this example, the transmitter 302 may be formed on the space between adjacent grooves 520 of the attenuator 310. Alternatively, the transmitter 302 is formed on the grooves 520 of the attenuator 310. In this example, the attenuator 310 is formed by a plurality of grooves 520 inside of the tool body 308 to attenuate propagation of unwanted wave modes, such as a collar extensional mode with acoustic contrast and spring-mass effect. Alternatively, the attenuator 310 could be formed by a plurality of grooves 520 outside of the tool body 308. While the grooves 520 shown in FIG. 5b are of equal spacing, the grooves 520 can alternatively be formed using unequal spacing. Additionally, the grooves 520 may be filled with an acoustic damping material, such as the loose granular material described above, to enable more effective damping of unwanted structure-borne acoustic signals, such as, for example, collar arrivals. In an alternative example, the attenuator 310 may be formed without grooves on the tool body 308 when collecting quadrupole mode measurements.

The example acoustic measurement tool 500 additionally includes electronics cartridges 522 contained within the tool body 308 to drive the transmitters 302 and 304 as described above. Additionally, the electronics cartridges 522 can acquire and store data from the receiver 306, as well as communicate with other tools.

Figure 6A:
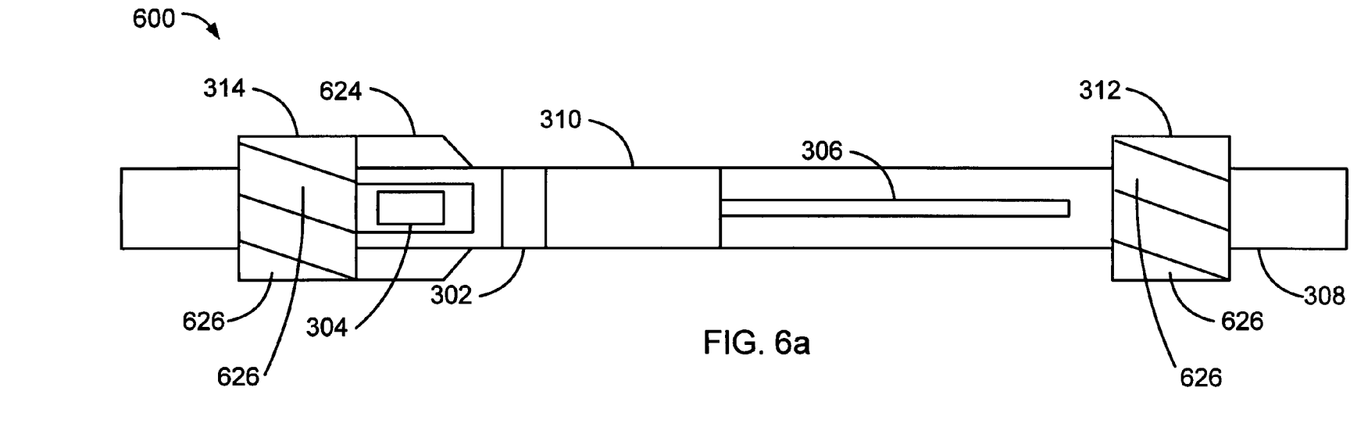
FIG. 6a depicts an example acoustic measurement tool having a transmitter coupled to a plurality of extended blocks.

FIG. 6a illustrates an example acoustic measurement tool 600 having the transmitter 304 coupled to a plurality of extended-blocks 624. The positioning of the transmitter 302, the attenuator 310, the receiver 306 and the stabilizers 312 and 314 is similar to the positioning shown in FIG. 3. However, the positioning of these components could be similar to the positioning used in any of the example acoustic measurement tools described herein. The transmitter 304 is coupled to the extended blocks 624 such that the transmitter 304 is formed within the extended blocks 624 to enable the driver elements of the transmitter 304 to excite a borehole at positions close to the borehole wall. Additionally, the extended blocks 624 can be aligned with the blades 626 of the stabilizer 314 to ensure mud flow.

Figure 6B:
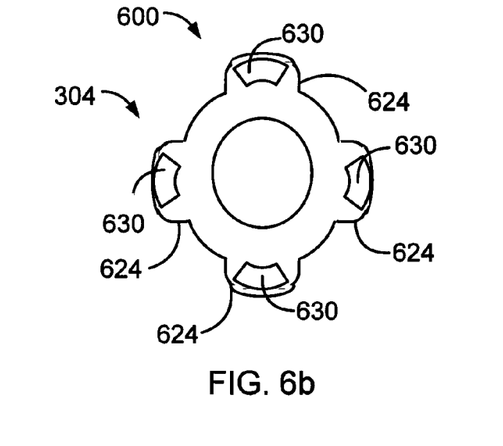

FIG. 6b illustrates a cross-sectional view of the example acoustic measurement tool 600 of FIG. 6a. In this example, the transmitter 304 is formed using a plurality of azimuthally spaced acoustic driver elements 630, each of which is coupled to a respective one of the plurality of extended blocks 624, to excite the borehole at positions close to the borehole wall. More detailed information on forming the transmitters 302 and 304 using a plurality of azimuthally spaced acoustic driver elements 630 can be found below in connection with FIGS. 7b and 7c.

Figure 7A:
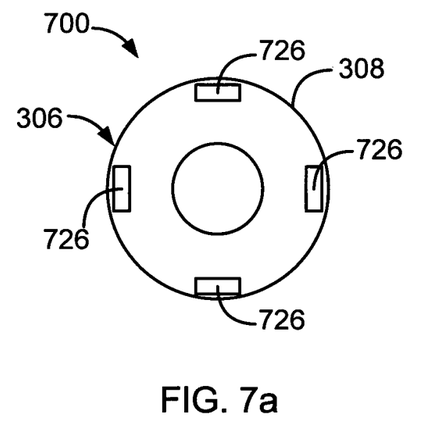
FIG. 7a depicts a cross-sectional view of a receiver portion of an acoustic measurement tool.
Figure 7B:
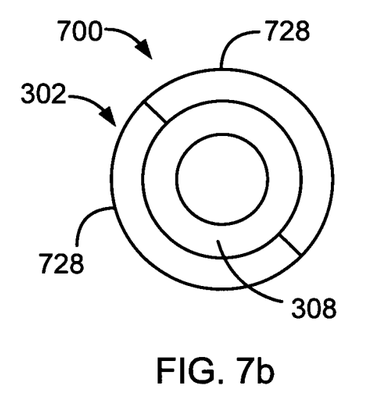
FIG. 7b depicts a cross-sectional view of a transmitter portion of the acoustic measurement tool of FIG. 7a, where the transmitter is a monopole source.
Figure 7C:
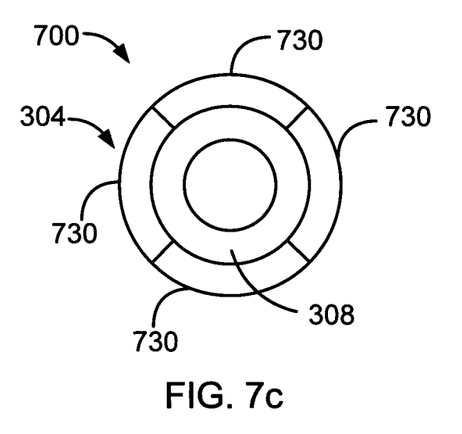
FIG. 7c depicts a cross-sectional view of a transmitter portion of the acoustic measurement tool of FIG. 7a, where the transmitter is a multipole source.

FIGS. 7a-7c illustrate cross-sectional views of an acoustic measurement tool 700. FIG. 7a illustrates the cross-sectional view of the receiver 306 portion of the acoustic measurement tool 700. While the receiver 306 is shown here in connection with the example acoustic measurement tool 700, it may be formed in the same manner on any of the example acoustic measurement tools herein described. In this example, the receiver 306 is formed on the tool body 308 to acquire monopole or multipole waves. Generally, the outer diameter of the receiver 306 can be formed to have a diameter that is the same or different than the outer diameter of the tool body 308 without affecting the propagation or recording of the transmitted waves. The receiver 306 can be formed on the tool body 308 using a plurality of receiver arrays 726. In this example, the receiver 306 is formed on the tool body 308 using four receiver arrays 726. The signals recorded by these receiver arrays 726 may be decomposed into monopole, dipole, and quadrupole modes using a spatial Fourier transform. In an alternative example, the receiver 304 may be formed on the tool body 308 using eight receiver arrays 726. Forming the receiver 304 with eight receiver arrays 726 enables cross-line quadrupole measurements to be acquired. Furthermore, the use of eight receiver arrays 726 increases the likelihood of undesired higher-order modes being rejected such as, for example, octupole mode during monopole mode operation. Additionally, the use of eight receiver arrays 726 ensures higher quality azimuthal discrimination for imaging applications.

FIG. 7b illustrates the cross-sectional view of the transmitter 302 portion of the acoustic measurement tool 700. While the transmitter 302 is shown here in connection with the example acoustic measurement tool 700, it may be formed in the same manner on any of the example acoustic measurement tools herein described. In this example, the transmitter 302 is formed on the tool body 308 to operate as a monopole source. The transmitter 302 can be formed using a plurality of acoustic driver elements 728, each of which is distinct or separate and forms a portion of a cylinder. In this example, the transmitter 302 is formed using two cylindrically-shaped acoustic driver elements 728, each having a semi-circular profile, to be mounted on the tool body 308. Forming the transmitter 302 with these two driver elements 728 enables the transmitter 302 to operate in a monopole firing mode.

While the transmitter 302 may be dedicated to a monopole firing mode, it can excite some quadrupole mode as contamination. To reduce quadrupole contamination in received signals, the cylindrically-shaped acoustic driver elements 728 are mounted on the tool body 308 to be offset from the receiver arrays 726 of FIG. 7a. For example, the transmitter 302 is aligned on the acoustic measurement tool 700 to have a forty-five degree azimuthal offset relative to the receiver arrays 726. Orienting the transmitter 302 in this manner reduces reception by the receiver arrays 726 of a higher-order mode than provided by the transmitter 302. In particular, offsetting the driver elements 728 minimizes any quadrupole contamination onto monopole signals at the receiver 306 because the azimuthal offset causes the quadrupole signal to be minimized at the receiver 306.

In an alternative example of an acoustic measurement tool 700, the transmitter 302 can be configured to operate as a multipole source in the same manner as the transmitter 304 described below in FIG. 7c while maintaining the forty-five degree azimuthal offset relative to the receiver arrays 726. Thus, the transmitters 302 and 304 can excite monopole, dipole, or quadrupole modes. As a result, both in-line and cross-line signals of the quadrupole mode can be recorded by the receiver 306.

FIG. 7c illustrates the cross-sectional view of the transmitter 304 portion of the acoustic measurement tool 700. While the transmitter 304 is shown here in connection with the example acoustic measurement tool 700, it may be formed in the same manner on any of the example acoustic measurement tools herein described. In this example, the transmitter 304 is formed on the tool body 308 to operate as a multipole source. The transmitter 304 can be formed using a plurality of acoustic driver elements 730, each of which is distinct or separate and forms a portion of a cylinder. In this example, the transmitter 304 is formed using four cylindrically-shaped acoustic driver elements 730, each having a quarter circular profile. Forming the transmitter 304 with these four driver elements 730 enables the transmitter 304 to emit pressure waves with the same polarities to operate in a monopole firing mode or alternating polarities to operate in a quadrupole firing mode. These cylindrically-shaped acoustic driver elements 730 are mounted on the tool body 308 to be aligned with the four receiver arrays 726 of FIG. 7a. Thus, the transmitter 304 is oriented on the tool body 308 to be aligned azimuthally with the respective receiver arrays 726, thereby allowing the in-line quadrupole signals to be recorded.

Alternatively, the transmitter 304 can be configured to operate as a monopole source in the same manner as the transmitter 302 described above in FIG. 7b while maintaining the azimuthal alignment with the receiver arrays 726. Generally speaking, each of the transmitter firing modes, monopole or multipole, typically requires the transmitter to be a certain shape and/or made of a certain type of piezoelectric material, such as for example, lead titanate or lead zirconate titanate, to realize excitation of the transmitter in high mode purity.

What is claimed is:

1. An apparatus for acoustic measurement in a downhole environment comprising:
   a downhole tool having a body;
   a plurality of transmitters located on the body;
   a receiver located on the body a distance from the transmitters; and
   an attenuator section integrally formed on the body between at least one transmitter of the transmitters and the receiver,
   wherein each transmitter is spaced at a different axial distance from the receiver,
   wherein at least one of the transmitters is located on the attenuator section, between portions of the attenuator section, for a quadrupole or multipole firing mode, and
   wherein at least another one of the transmitters is located on extended blocks and spaced longer apart from the receiver than the at least one of the transmitters located on the attenuator section to attenuate propagation along the body for a monopole firing mode, wherein the extended blocks extend radially outwardly from the body and permit, therebetween, mud communication with the receiver and the at least one of the transmitters located on the attenuator section.

2. The apparatus of claim 1, wherein the attenuator section is formed by a plurality of grooves.

3. The apparatus of claim 1, wherein the outer diameter of at least one of the transmitters is equal to the outer diameter of the body.

4. The apparatus of claim 1, wherein at least two of the transmitters are located to one side or both sides of the receiver on the body.

5. The apparatus of claim 4, wherein the attenuator section is free from grooves on the body for a quadrupole measurement.

6. The apparatus of claim 4, wherein at least one of the plurality of transmitters has an outer diameter larger than the overall body outer diameter.

7. The apparatus of claim 1, wherein at least one of the transmitters comprises a plurality of acoustic driver elements.

8. The apparatus of claim 7, wherein each of the plurality of acoustic driver elements is distinct and forms a portion of a cylinder defined by the plurality of acoustic driver elements.

9. The apparatus of claim 1, wherein the receiver comprises a plurality of receiver arrays and wherein at least one of the transmitters is monopole and oriented on the body relative to at least one of the receiver arrays to reduce reception by at least one receiver array of a higher-order mode than provided by the at least one of the transmitters.

10. The apparatus of claim 9, wherein the at least one of the transmitters comprises a plurality of acoustic driver elements and wherein each of the acoustic driver elements is oriented on the body to be offset azimuthally relative to a respective one of the receiver arrays.

11. The apparatus of claim 10, wherein the at least another one of the transmitters comprises a second plurality of acoustic driver elements, each of which is oriented on the body to be aligned azimuthally with a respective one of the receiver arrays.

12. The apparatus of claim 11, wherein the at least another one of the transmitters comprises four cylindrically-shaped driver elements wherein each comprises a quarter circle profile, wherein the at least one of the transmitters comprises two cylindrically-shaped acoustic driver elements wherein each comprises a semi-circular profile, wherein the four cylindrically-shaped elements are aligned azimuthally with the respective ones of the receiver arrays, and wherein the two cylindrically-shaped elements are offset azimuthally relative to the respective ones of the receiver arrays.

13. The apparatus of claim 11, wherein the plurality of transmitters comprises four cylindrically-shaped driver elements wherein each comprises a quarter circle profile, wherein the four cylindrically-shaped elements are aligned azimuthally with the respective ones of the receiver arrays.

14. The apparatus of claim 1, wherein at least one of the at least another one of the transmitters comprises a plurality of azimuthally spaced acoustic driver elements and wherein each of the acoustic driver elements is coupled to a respective one of the extended blocks.

15. The apparatus of claim 1, further comprising at least two stabilizers located on the body such that the transmitters, receiver and attenuator section are located between the at least two stabilizers.

16. The apparatus of claim 15, wherein the at least two stabilizers are adjustable for borehole diameter.

17. The apparatus of claim 1, further comprising grooves located on the body to contain the electrical wires for at least one transmitter.

18. An apparatus for acoustic measurement in a downhole environment comprising:
a downhole tool having a body;
a plurality of transmitters located to one side of the body with different firing modes;
a receiver located on the body a distance from the transmitters;
grooves integrally formed on the body between at least one of the transmitters and the receiver, wherein the at least one of the transmitters is located over a space between adjacent grooves;
wherein at least another one of the transmitters is located on extended blocks and spaced longer apart from the receiver than the rest of the transmitters to attenuate propagation along the body for a monopole firing mode wherein the extended blocks extend radially outwardly from the body and permit, therebetween, mud communication with the receiver and the at least one of the transmitters located over the space between the adjacent grooves; and
wherein a portion of the grooves are localized between the at least one of the transmitters and the rest of the transmitters for a quadrupole or multipole firing mode of the rest of the transmitters.

19. An apparatus for acoustic measurement in a downhole environment comprising:
a downhole tool having a body;
a plurality of monopole acoustic driver elements located on the body to form monopole transmitters at different locations of the body;
receiver arrays located on the body a distance from the monopole acoustic driver elements wherein the receiver arrays comprise an azimuthal orientation;
an attenuator section integrally formed on the body between the monopole acoustic driver elements and the receiver arrays; and
wherein each of the plurality of monopole acoustic driver elements in the monopole transmitters is located on an extended block, having a forty-five degree azimuthal offset relative to the azimuthal orientation of the receiver arrays, whereby the plurality of monopole acoustic driver elements reduce reception by the receiver arrays of a higher-order mode than provided by the plurality of monopole acoustic driver elements, wherein the higher-order mode includes a quadrupole mode and wherein the extended blocks extend radially outwardly from the body and permit, therebetween, mud communication with the receiver arrays.

20. The apparatus of claim 1 comprising a stabilizer that extends radially outwardly from the body and that comprises blades that permit, therebetween, mud communication with the at least another one of the transmitters that is located on the extended blocks.

* * * * *